Oct. 24, 1944.  F. MARTINDELL  2,360,960
WINDING APPARATUS
Filed July 23, 1943  5 Sheets-Sheet 1

FIG. I

INVENTOR
F. MARTINDELL
BY
Harry L. Duff
ATTORNEY

Oct. 24, 1944.   F. MARTINDELL   2,360,960
WINDING APPARATUS
Filed July 23, 1943   5 Sheets-Sheet 2

INVENTOR
F. MARTINDELL
BY
ATTORNEY

Oct. 24, 1944.  F. MARTINDELL  2,360,960
WINDING APPARATUS
Filed July 23, 1943  5 Sheets-Sheet 3
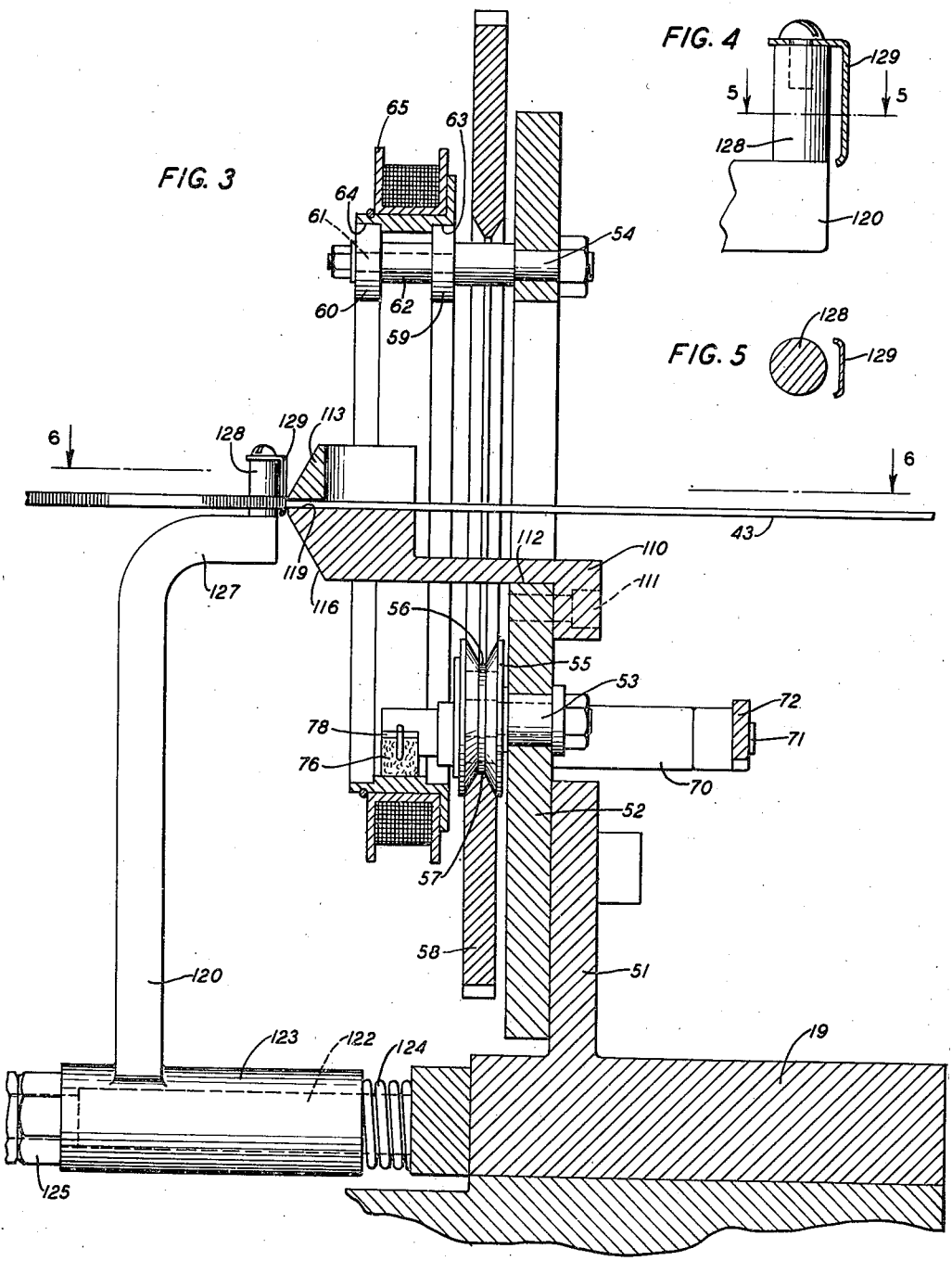
INVENTOR
F. MARTINDELL
BY
ATTORNEY

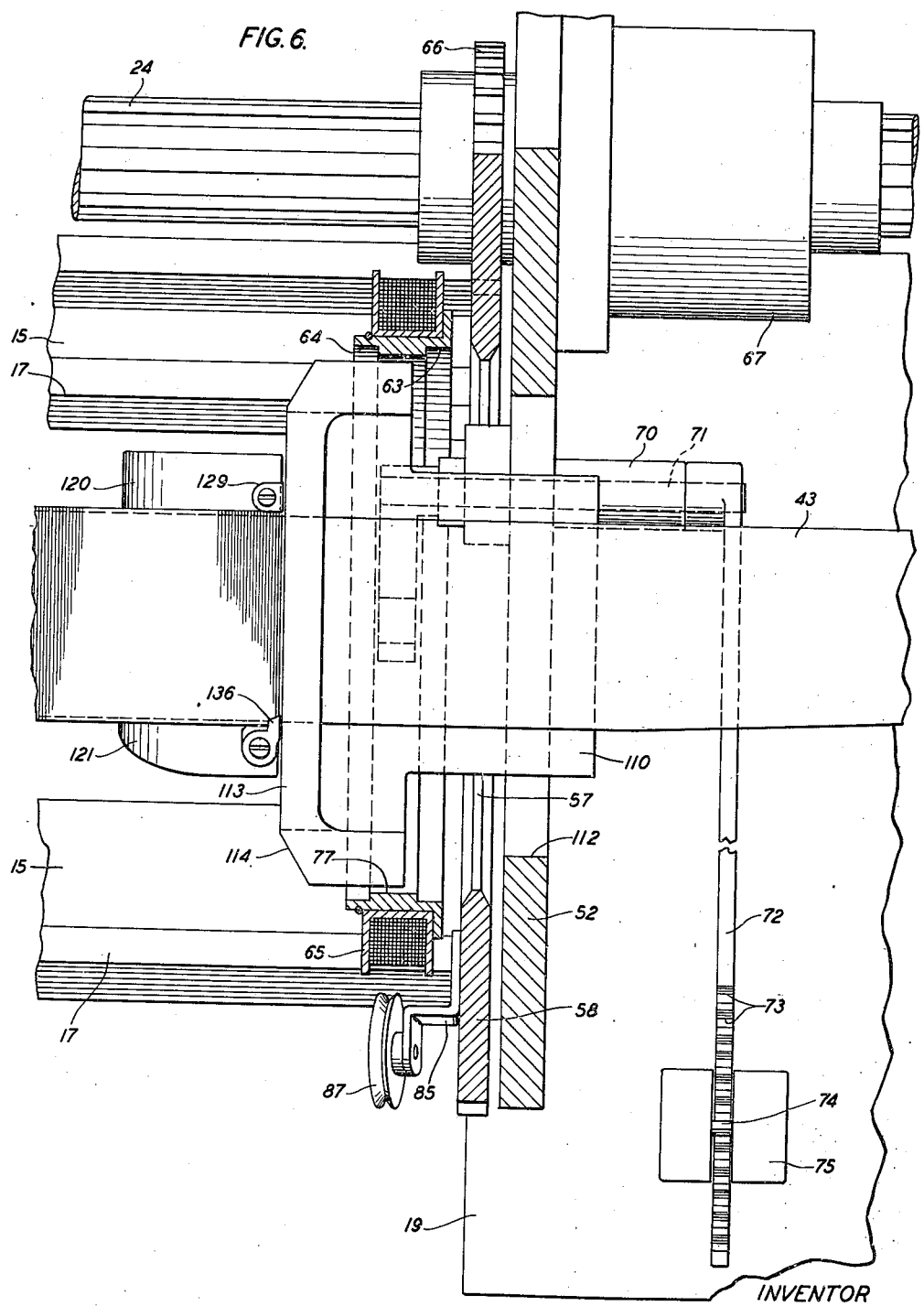

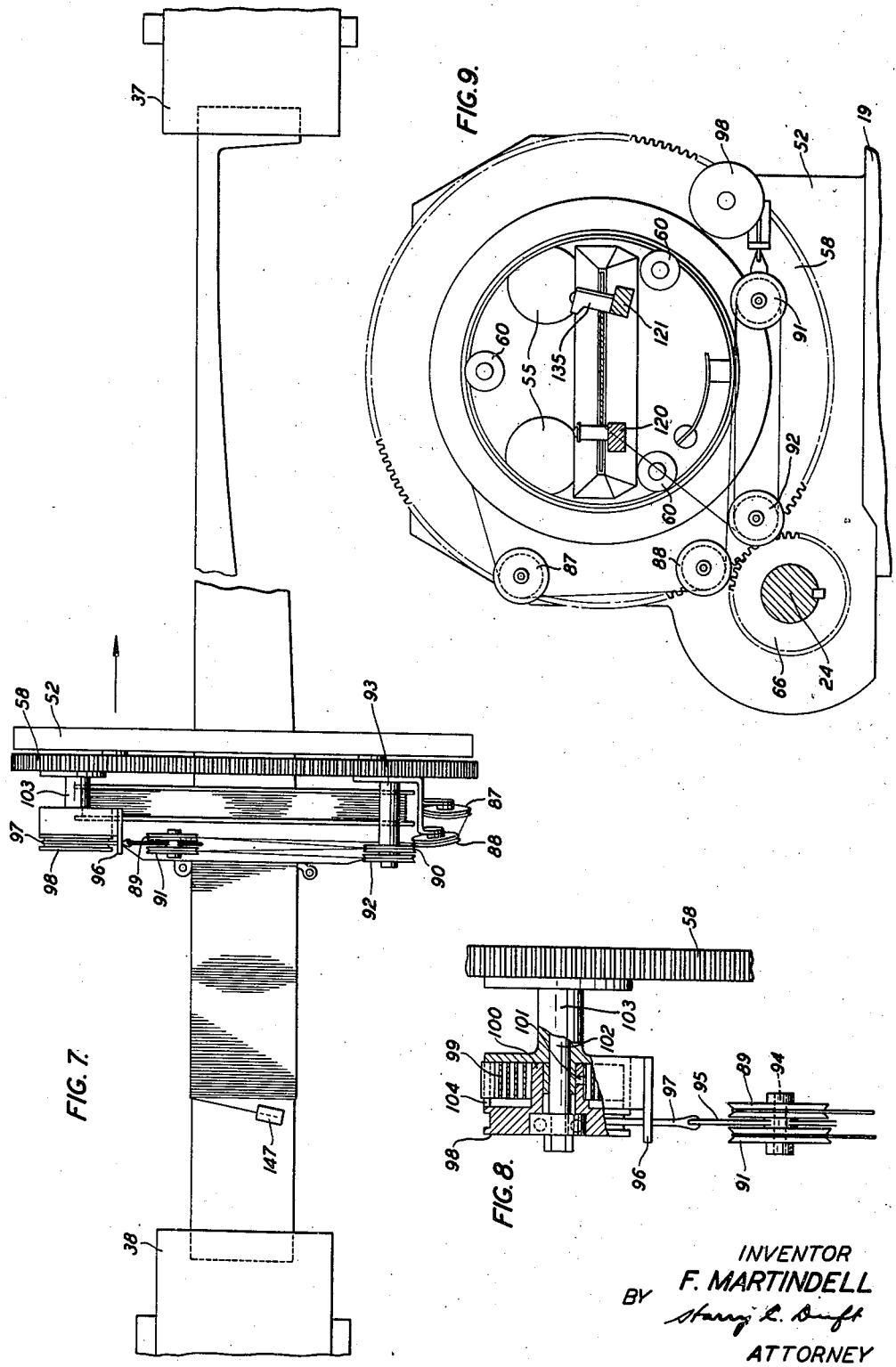

Patented Oct. 24, 1944

2,360,960

UNITED STATES PATENT OFFICE 2,360,960

WINDING APPARATUS

Frank Martindell, Western Springs, Ill., assignor to Western Electric Company, Incorporated, New York, N. Y., a corporation of New York Application July 23, 1943, Serial No. 495,912

10 Claims. (Cl. 242—9)

This invention relates to winding apparatus and more particularly to an apparatus for winding resistance cards to be used in potentiometers.

It is an object of the present invention to provide a simple winding apparatus for expeditiously winding electrical devices with a high degree of accuracy.

In accordance with one embodiment of the invention, particularly adaptable to wind a resistance wire on a flat insulator of irregular shape, a feed screw and a splined shaft, driven from a common source, advance a carriage along a lathe bed and drive a winding mechanism mounted on the carriage, respectively. The winding mechanism comprises a spool ring or supply reel and a ring gear surrounding the insulator and mounted on the carriage whereby windings of wire may be laid with a high degree of accuracy on the insulator, which is of rectangular cross section, and which may be a flat strip having one irregularly shape edge. A friction brake mounted on the carriage normally tends to apply a braking force on the supply reel, whereby the tension in the wire being applied to the insulator is maintained relatively constant. Suitable guides travel with the ring gear to withdraw the wire from the supply reel and direct it onto the insulator.

A clear understanding of the invention may be had by reference to the following detailed description when considered in conjunction with the accompanying drawings, wherein Fig. 1 is a front elevational view of an apparatus constituting a preferred form of the invention;

Fig. 3 is a fragmentray vertical sectional view on a larger scale, taken substantially along the line 3—3 of Fig. 2 in the direction of the arrows;

Fig. 4 is an enlarged fragmentary detail view, partly in section, of a portion of one of a series of wire guiding means provided in the apparatus;

Fig. 5 is a transverse sectional view taken substantially along the line 5—5 of Fig. 4 in the direction of the arrows;

Fig. 6 is a plan section taken along the line 6—6 of Fig. 3 in the direction of the arrows;

Fig. 7 is a plan view showing an insulator in position in the apparatus, parts being broken away to conserve space;

Fig. 8 is an enlarged fragmentary detail view showing a portion of a mechanism for taking up slack in the wire as it is fed from the supply reel to the insulator; and Fig. 9 is a transverse sectional view showing the face of the supply reel and ring gear in a position reversed from that shown on a larger scale in Fig. 2.

Figure 1:
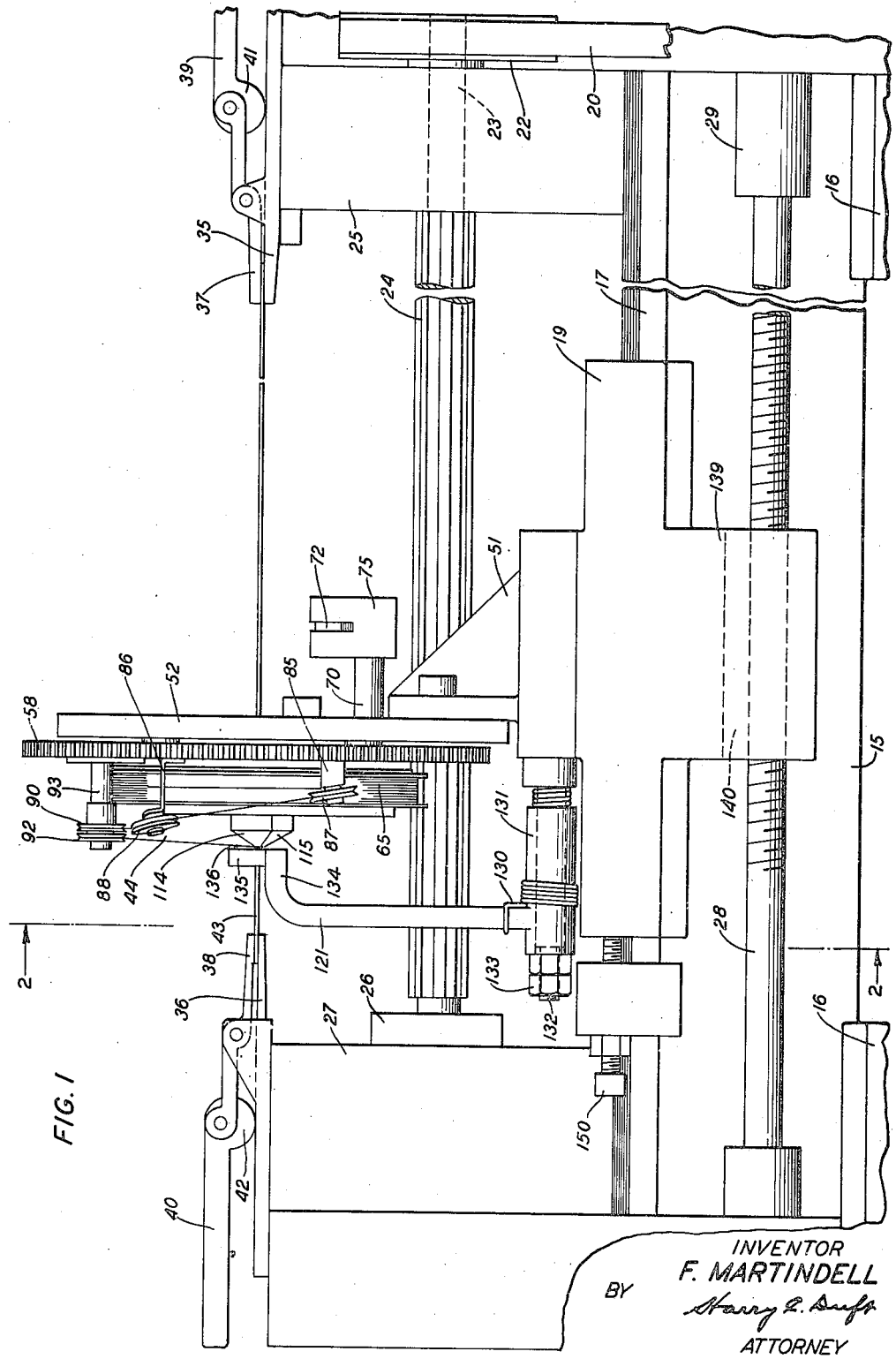
Figure 2:
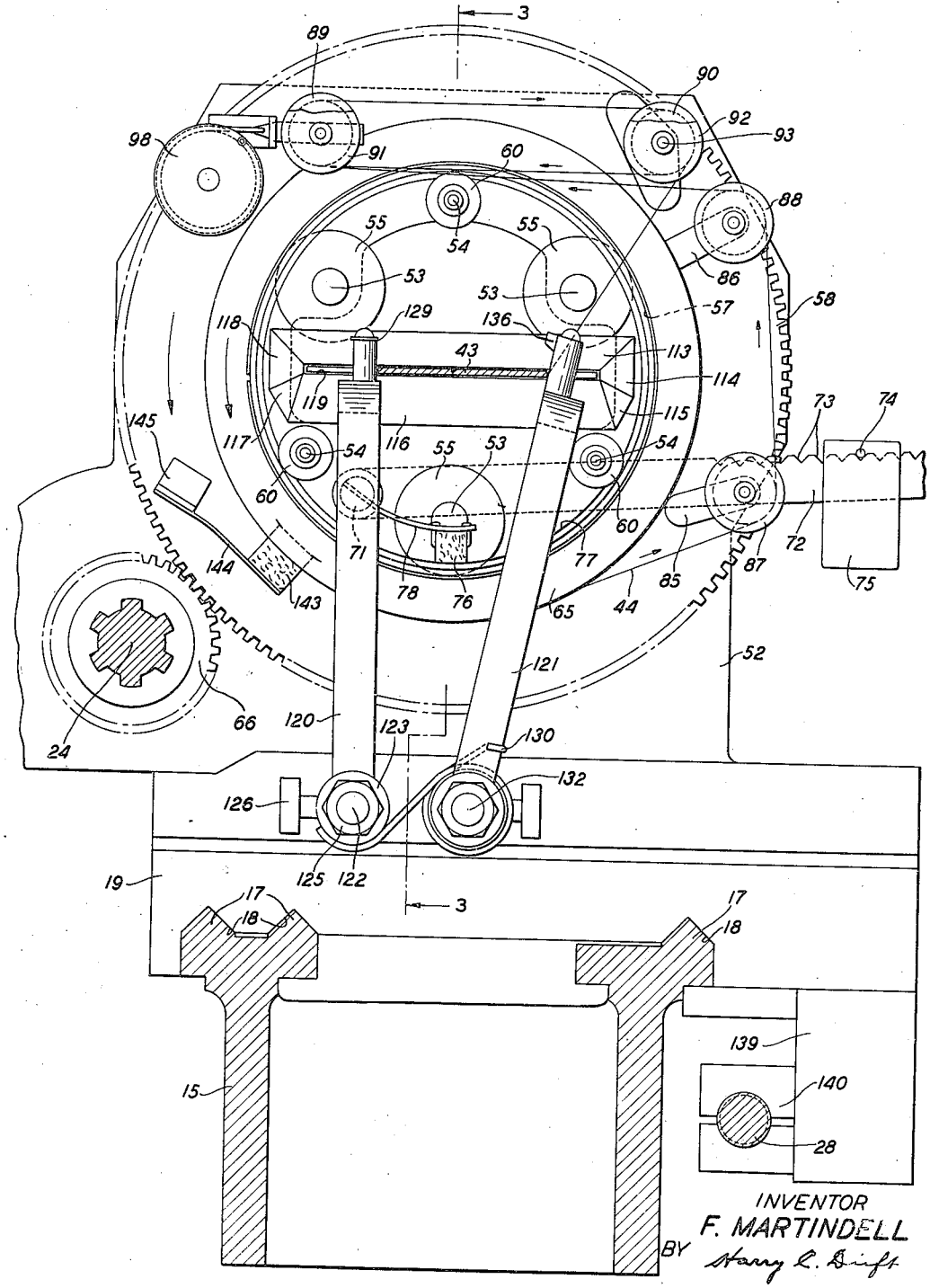
Fig. 2 is a transverse vertical sectional view on an enlarged scale, taken substantially along the line 2—2 of Fig. 1 in the direction of the arrows.

In the drawings, particular reference being had to Figs. 1 and 2, there is shown a lathe bed 15, which may be mounted upon suitable standards 16—16 and which is provided on its upper surface with ways 17—17 in registry with cooperating grooves 18—18 formed in the underside of a carriage 19, which is thus slidably mounted on the lathe bed 15. Power for driving the apparatus may be supplied from a suitable motor (not shown), which drives a belt 20 (Fig. 1) passing over a pulley 22. The pulley 22 is, in turn, suitably attached to a reduced portion 23 of a splined shaft 24. The shaft 24 is journalled in bearings 25 and 26, the bearing 25 being mounted upon the upper surface of the lathe bed 15 and the bearing 26 being mounted in the right hand end (Fig. 1) of a gear reducer unit 27, which is, in turn, mounted upon the upper surface of the lathe bed 15. Through suitable gearing in the gear reducer unit 27, the shaft 24 transmits power to drive a feed screw 28, the left end of which extends into the gear reducer unit 27 and the right end of which is journalled in a bearing 29 mounted on the lathe bed 15.

Fixed to the upper surface of the bearing 25 and the gear reducer unit 27 are a pair of clamping jaws 35 and 36, respectively, having hinged on them cooperating clamping jaws 37 and 38. The jaws 37 and 38 have levers 39 and 40, respectively, pivoted to them and each of the levers is provided with camming portions 41 and 42, respectively, projecting eccentrically of the pivot point of the lever to engage the upper surfaces of the clamping members 35 and 36, respectively, and force the inwardly extending portions of the clamping jaws 37 and 38 toward the inwardly extending portions of the clamping jaws 35 and 36, respectively. These cooperating clamping jaws are provided for clamping an insulator 43, known as a card, in position to have the windings of a resistance wire 44 wound upon it. The cards 43, with the resistance wire 44 wound upon them, are adapted to serve as the resistance elements in a potentiometer which must be highly accurate in its operation and, accordingly, the insulators or cards 43 have a predetermined uniform thickness, but their width may be varied to follow a predetermined contour, whereby the amount of resistance per inch of card may vary at a predetermined rate, not necessarily constant. In the drawings, a card, which gradually tapers from one end of its wound portion to the other end, is shown, but it will be understood that the apparatus is capable of winding convolutions of resistance wire 44 on a card 43 of any desired contour.

Mounted upon the carriage 19 is a support bracket 51, which serves to support a plate 52 carrying a plurality of stud shafts 53—53 and 54—54. The stud shafts 53 are three in number and are equally spaced one from another to carry a plurality of gear supporting rollers 55. The rollers 55 have a peripheral groove 56 (Fig. 3) formed in them into which is nested the inner annular surface 57 of a ring gear 58, which acts as a take-off ring for applying wire to the card 43. The rollers 55 are freely rotatable on the stud shafts 53 and thus support the ring gear for rotation with respect to the plate 52. The stud shafts 54 extend through the central aperture in the ring gear 58 and each of them supports a pair of reel supporting rollers 59 and 60 on a reduced portion 61 thereof, a sleeve 62 serving to separate the two rollers 59 and 60 one from another in position to engage surfaces 53 and 64 on a supply reel or spool ring 65. The sets of rollers 59 and 60 are equally spaced one from another and serve to rotatably support the reel 65 in position, where it encircles a card or insulator 43 clamped in position to receive windings of wire. An annular internally grooved gear 66 meshes with the ring gear 58 and is journalled in a bearing block 67 attached to the plate 52. The grooves in the gear 66 receive the splines of the splined shaft 24 and thus the gear 66 will transmit motion from the shaft 24 to the ring gear 58, but may slide along the shaft when the carriage 19 moves the plate 52 longitudinally of the shaft.

A bearing 70 mounted on a plate 52, as seen most clearly in Fig. 6, serves to rotatably support a shaft 71, to one end of which a counterbalance lever 72 is attached. The counterbalance lever 72 is provided with a series of notches 73 adapted to receive a support pin 74 extending across between the two upwardly extending portions of a counterweight 75. The counterweight 75 may be shifted along the lever 72 to regulate the braking effect of a brake shoe 76 against the inner surface 77 of the annular supply reel 65 since the brake shoe 76 is mounted upon a relatively stiff leaf spring 78 fixed to the shaft 71.

Mounted upon the ring gear 58 are a pair of angle brackets 85 and 86 having guide pulleys 87 and 88 freely rotatable thereon for guiding the wire 44 from the supply reel 65 to a guide pulley 89 and from thence over pulleys 90, 91 and 92 for application to the insulator 43. The arrangement of these pulleys is best seen in Figs. 2 and 7. The pulleys 90 and 92 are mounted upon and freely rotatable with respect to a post 93 mounted on the ring gear 58 and the pulleys 89 and 91, as seen most clearly in Fig. 8, are freely rotatable about a shaft 94 set in a plate 95. The plate 95 is attached to a chain or cord 97, which is guided through a bracket 96 to a spring actuated drum 98. The drum 98 is normally urged to rotate in a counter-clockwise direction by a spiral spring 99 attached to the hub 100 of the drum at 101. The drum is mounted to rotate on a shaft 102 set into a support bracket 103, which is, in turn, mounted upon the ring gear 58. The support bracket 103 supports the bracket 96 and has the outer ends of the spiral spring 99 attached to it by means of a pin 104. Thus, the two pulleys 89 and 91 are normally urged to move to the left (Fig. 2) and serve to compensate for minor variations in tension in the wire 44 as it is withdrawn from the supply reel 65 and wrapped on the insulator or card 43.

A guide bracket 110 is fixed by means of a machine screw 111 to the right hand wall (Fig. 3) of the plate 52 and is bent over to extend through a central aperture 112 formed in the plate 52. The formed-over portion of the bracket 110 also extends through the ring gear 58 and supply reel 65, which are supported for rotation with respect to the plate 52, and the bracket is provided with six guiding surfaces 113, 114, 115, 116, 117 and 118, which are disposed around a slot 119. The slot 119 is just sufficiently wide to permit the passage therethrough of the insulator 43 when the plate 52 moves along the lathe bed 15, as will be described more in detail hereinafter. Cooperating with the guide surfaces 113 to 118 on the bracket 110 are a pair of guide supporting members 120 and 121. The guide supporting member 120 is mounted on a post 122, which is, in turn, supported by the carriage 19, the member 120 being rigidly attached to a sleeve 123 which surrounds the post 122 and is held in position between a compression spring 124 and lock nut assembly 125. After the guide supporting member 120 has been properly adjusted, it may be locked in position with respect to the post by a thumb nut 126 threaded into the sleeve 123 and engaging the post 122. This guide member 120 is bent over, as shown at 127, and carries on its upper surface a post 128, on which, in turn, there is mounted a guide finger 129, the configuration of which will be clearly apparent by reference to Figs. 4 and 5. The post 128, in the operation of the apparatus, is adapted to bear against the straight side of the insulator 43 and to hold the guide finger 129 in close proximity to the guide surfaces of the bracket 110, thereby to properly guide the wire 44 into position on the insulator 43.

The guide supporting member 121 is normally urged to rock counter-clockwise (Fig. 2) by a coil spring 130, one end of which is bent around the guide supporting member 121 and the other end of which is in engagement with the sleeve 123 (Fig. 2), the convolutions of the coil spring encircling a sleeve 131, which is rigidly attached to guide supporting member 121 and which encircles a post 132 (Figs. 1 and 2) that supports guide supporting member 121. The sleeve 131 is held in place on the post 132 by a lock nut assembly 133 and the upper end of the guide supporting member 121 is bent over, as shown at 134 (Fig. 1) to support an irregularly shaped guide member 135 in position to guide the wire 44 into engagement with the guiding surfaces of the bracket 110. The guide member 135 is provided with a guide finger 136, which insures proper positioning of the wire with respect to the guiding surfaces of the bracket 110.

The carriage 19 has extending downwardly from it a bracket 139, on which there is mounted a feed nut 140, which threadedly engages the feed screw 28. Any suitable type of feed nut 140 may be provided, as is usual in similar mechanisms, whereby, after the feed screw 28 has fed the carriage 19 from one end of the lathe bed 15 to the other, the feed nut 140 may be released from the feed screw 28 to permit the carriage 19 to be returned to its starting position. No details of this mechanism have been shown since numerous devices would function in this capacity.

Various details of construction and the mode of operation of the apparatus will be apparent from the following brief description of the operation of the apparatus in winding a resistance card for use in a potentiometer. An insulator 43 may be clamped between the clamping members 36 and 38 and 35 and 37 by manipulating handles 40 and 39 after properly positioning the insulator 43 by inserting it through the slot 119 in the bracket 110 and properly aligning the edge of the surface 113 with a scribed mark on the insulator 43. In setting the apparatus for operation, the carriage 19 must be shifted to the left (Fig. 1) and, accordingly, an adjustable abutment screw 150 has been provided for engaging the carriage 19 and preventing it from movement beyond a predetermined position to the left (Fig. 1). After a card or insulator 43 has been properly mounted in the apparatus, the end of the resistance wire 44 may be attached to the insulator 43, for example, by sticking it to the insulator by means of a piece of adhesive tape 147 and the motor (not shown) for driving the belt 20 may then be set into operation. Since the wire passes from the reel 65 over the guide pulleys 87, 88, 89, 90, 91 and 92 in succession before it is applied to the insulator 43, the rotation of the ring gear 58, in carrying the pulleys around with it, will cause the wire 44 to be wrapped on the insulator 43. Under the preferred conditions, the counterweight 75 will exert sufficient pressure on the brake shoe 76 to maintain the proper tension on the wire being wound and this tension will be such that if the ring gear 58 is stationary, the plate 95, which supports the pulleys 89 and 91, will be pulled away from the spring drum 98 slightly. Thus, when slack tends to occur in the wire being wound, the spring 99 will rotate the drum 98 and the servings of wire at that time positioned between the guide pulleys 89, 90, 91 and 92 will increase slightly in length. This will maintain the tension in the strand substantially constant despite the fact that due to the configuration of the insulator 43, the windings are applied eccentrically of the axis of the ring gear 58. As the winding of the wire 44 on the insulator 43 progresses, the ring gear 58, in passing from the position shown in Fig. 2 to the position shown in Fig. 9, will, in succession, cause the wire 44 to engage against the guide finger 136 and the guide finger 129 in succession, thereby to insure that the wire will be laid tightly against the guiding surface 113 as the carriage 19 moves along on the ways 17—17. In the event that breakage occurs in the wire, the ring gear 58 will continue to rotate, although the brake shoe 76 may stop the rotation of the supply reel 65. However, the wire will not uncoil from the supply reel 65 an appreciable amount due to the provision of a spring-pressed brake shoe 143 mounted on the end of a leaf spring 144 which is, in turn, attached to a bracket 145 on the face of the ring gear 58. The cushion member 143 normally engages the wire 44 wound on the supply reel 65.

It will be apparent that by properly adjusting the counterweight 75 and maintaining the proper relation between the speeds of rotation of the splined shaft 24 and feed screw 28, the wrapping of the convolutions of wire 44 on the insulator 43 may be very accurately controlled and that the tension under which the wire is wrapped on the insulator may be closely regulated. After a resistance element has been wound in the apparatus and the desired number of turns of wire applied to the element, the end of the wire may be attached to the insulator 43 in any suitable manner and the clamps 37 and 38 released to permit the removal of the completed resistance element from the apparatus. Manipulation of the feed nut 140 will permit the restoring the carriage 19 to its left-hand position, as shown in Fig. 1, and after reengaging the feed nut 140 with the feed screw 28, a new resistance element may be wound in the apparatus. As the supply of wire 144 on the supply reel 125 is exhausted, a new reel may be placed on the rollers 59 and 60 by removing the rollers 60 from the stud shafts 61 and replacing the reel or spool ring.

What is claimed is:

1. A winding apparatus comprising a strand supply reel, means for positioning a core axially of the reel, means for supporting the reel for rotation about the core, a take-off ring rotatably mounted on the supporting means for withdrawing wire from the reel and applying it to the core, means for advancing the supporting means longitudinally of the core, means operable in timed relation to the operation of the advancing means for driving the take-off ring, and braking means on the supporting means for applying a predetermined braking force to the supply reel to maintain a predetermined tension on the strand.

2. A winding apparatus comprising a strand supply reel, means for positioning a core axially of the reel, means for supporting the reel for rotation about the core, a take-off ring rotatably mounted on the supporting means for withdrawing wire from the reel and applying it to the core, means for advancing the supporting means longitudinally of the core, means operable in timed relation to the operation of the advancing means for driving the take-off ring, braking means on the supporting means for applying a predetermined braking force to the supply reel to maintain a predetermined tension on the strand, a lever for operating said braking means, and a weight displaceable on said lever to vary the effect of the lever on the braking means.

3. A winding apparatus comprising a strand supply reel, means for positioning a core axially of the reel, means for supporting the reel for rotation about the core, a take-off ring rotatably mounted on the supporting means for withdrawing wire from the reel and applying it to the core, means for advancing the supporting means longitudinally of the core, means operable in timed relation to the operation of the advancing means for driving the take-off ring, braking means on the supporting means for applying a predetermined braking force to the supply reel to maintain a predetermined tension on the strand, and guiding means on the take-off ring for guiding the strand to the core.

4. A winding apparatus comprising a strand supply reel, means for positioning a core axially of the reel, means for supporting the reel for rotation about the core, a take-off ring rotatably mounted on the supporting means for withdrawing wire from the reel and applying it to the core, means for advancing the supporting means longitudinally of the core, means operable in timed relation to the operation of the advancing means for driving the take-off ring, braking means on the supporting means for applying a predetermined braking force to the supply reel to maintain a predetermined tension on the strand, and guiding means on the take-off ring for guiding the strand to the core including a pair of guide pulleys resiliently connected to the take-off ring for compensating for minor variations in tension on the strand.

5. In a winding apparatus, a rotatable strand supply reel, means for positioning a core axially of the reel, means for applying a braking force tending to oppose rotation of the reel, a ring gear rotatable around the core and movable along its axis of rotation, a plurality of strand guiding pulleys mounted on the ring gear, and a spring drum resiliently connecting at least one of said pulleys to the ring gear to take up slack in the strand.

6. In a winding apparatus, a rotatable strand supply reel, means for positioning a core axially of the reel, means for applying a braking force tending to oppose rotation of the reel, a ring gear rotatable around the core and movable along its axis of rotation, a plurality of strand guiding pulleys mounted on the ring gear, and a spring drum resiliently connecting at least one of said pulleys to the ring gear to take up slack in the strand, said means for applying a braking force including a brake shoe bearing against the inner surface of the supply reel, and adjustable means for applying a selected amount of pressure on the brake shoe.

7. In a winding apparatus, a rotatable strand supply reel, means for positioning a core axially of the reel, means for applying a braking force tending to oppose rotation of the reel, a ring gear rotatable around the core and movable along its axis of rotation, a plurality of strand guiding pulleys mounted on the ring gear, and a spring drum resiliently connecting at least one of said pulleys to the ring gear to take up slack in the strand, said means for applying a braking force including a brake shoe, a pivoted lever fixed to the brake shoe, and a weight shiftable on said lever to apply a selected amount of pressure on the lever.

8. A winding apparatus comprising a strand supply reel, means for positioning a core axially of the reel, means for supporting the reel for rotation about the core, a take-off ring rotatably mounted on the supporting means for withdrawing wire from the reel and applying it to the core, means for advancing the supporting means longitudinally of the core, means operable in timed relation to the operation of the advancing means for driving the take-off ring, braking means on the supporting means for applying a predetermined braking force to the supply reel to maintain a predetermined tension on the strand, and strand guiding means on the supporting means including cooperating relatively movable guide members for accurately directing the strand to the core.

9. In an apparatus for winding convolutions of strand on an irregularly shaped core, a supply reel rotatable around the core, strand feeding means rotatable around the core, a carriage movable longitudinally of the core for supporting the reel and feeding means, and spaced guide means on the carriage for directing the strand to the core, one of said guide means being resiliently urged to follow a contour of the core.

10. In an apparatus for winding convolutions of strand on an irregularly shaped core, a supply reel rotatable around the core, strand feeding means rotatable around the core, a carriage movable longitudinally of the core for supporting the reel and feeding means, and spaced guide means on the carriage for directing the strand to the core, one of said guide means being resiliently urged to follow a contour of the core and another of said guide means being settable to follow a straight side of the core and to cooperate with resiliently urged guide means to support the core.

FRANK MARTINDELL.